(No Model.) 2 Sheets—Sheet 1.
A. G. & O. G. HOHRE
MACHINE FOR PRODUCING PLAIN OR ORNAMENTAL ARTICLES FROM PLASTIC MATERIAL.
No. 361,822. Patented Apr. 26, 1887.
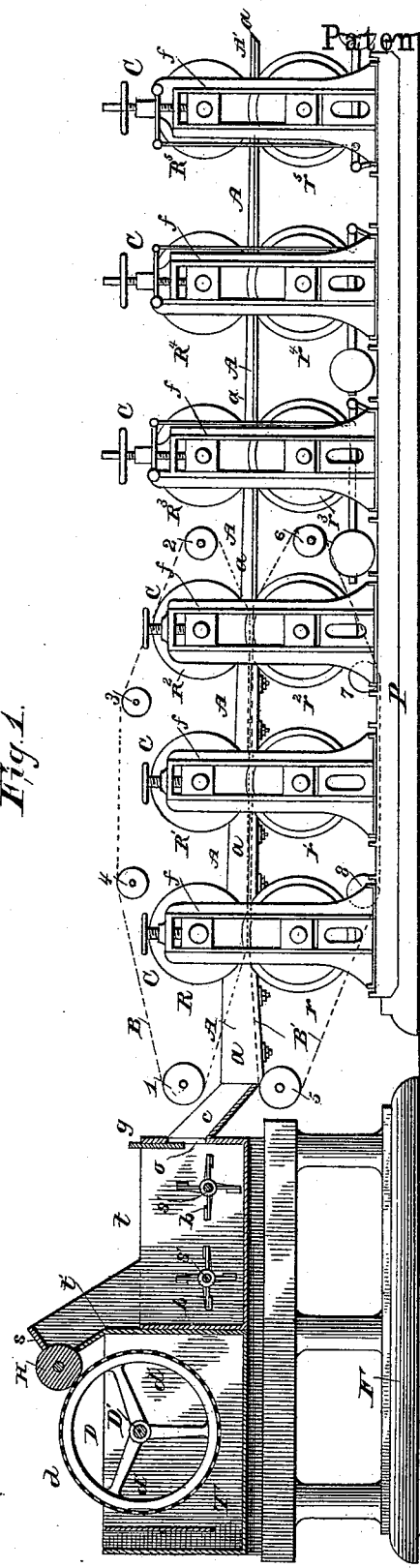
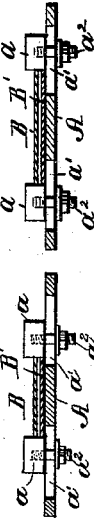
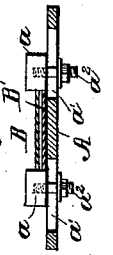
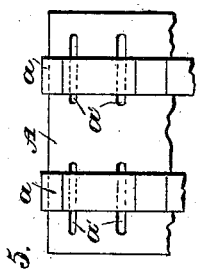
Witnesses.
Wm R. Davis
W. E. Boulter
Inventors
Andreas G. Hohre
Ole G. Hohre
per Henry Otis
Attorney
N. PETERS. Photo-Lithographer, Washington, D. C.

(No Model.) 2 Sheets—Sheet 2.
A. G. & O. G. HOHRE.
MACHINE FOR PRODUCING PLAIN OR ORNAMENTAL ARTICLES FROM PLASTIC MATERIAL.
No. 361,822. Patented Apr. 26, 1887.
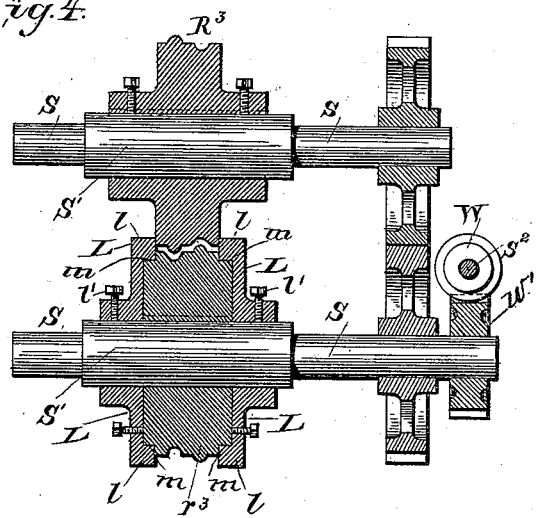
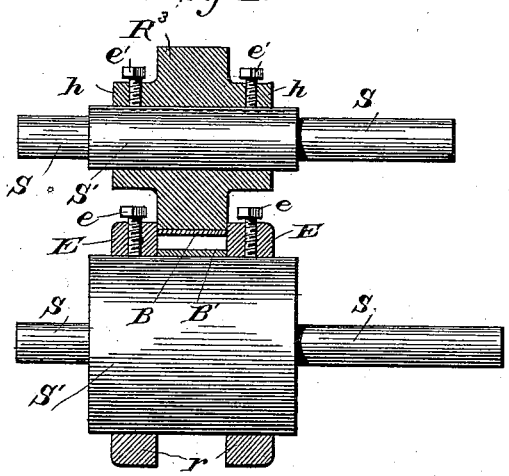
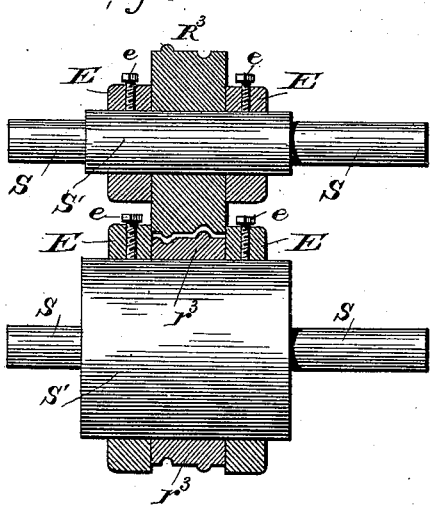
Witnesses.
Wm R. Davis.
W. E. Boulter.
Inventors
Andreas G. Hohre
Ole G. Hohre
per Henry Orth
Attorney

UNITED STATES PATENT OFFICE.

ANDREAS GUULSEN HOHRE AND OLE GUULSEN HOHRE, OF DRAMMEN, NORWAY.

MACHINE FOR PRODUCING PLAIN OR ORNAMENTAL ARTICLES FROM PLASTIC MATERIAL.

SPECIFICATION forming part of Letters Patent No. 361,822, dated April 26, 1887.

Application filed November 23, 1886. Serial No. 219,628. (No model.) Patented in Norway June 19, 1885.

*To all whom it may concern:*

Be it known that we, ANDREAS GUULSEN HOHRE and OLE GUULSEN HOHRE, citizens of Norway, residing at Drammen, in the Kingdom of Norway, have invented certain new and useful Improvements in Machines for Producing Plain or Ornamented Articles from Plastic Material; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Referring to the accompanying drawings, Figure 1 is a side elevation, partly in section, of a machine embodying our invention. Figs. 2 and 3 are sectional detail views of the compressing and profiling rolls. Fig. 4 is a like view thereof, showing a modification in the construction. Fig. 5 is a top plan view of a portion of the feed-table; and Figs. 6 and 7 are transverse sections thereof, showing the side walls of the feed-table adjusted to different widths, and feed-aprons varying in diameter employed in conjunction therewith.

This invention relates more especially to the production of plain or ornamented materials from wood pulp of any desired length and of any desired width and thickness within certain limits, though our said invention is applicable to any substance capable of being reduced to a pasty condition and that will part with its moisture when subjected to compression; and it consists in the means employed for producing said material, substantially as hereinafter fully described, and as set forth in the claims.

We will confine the description of the invention to the production of plain or ornamented or profiled materials—such as boards, rails, moldings, panels, &c.—from wood pulp; and in carrying out our said invention we take the pulp as it comes from the pulping-machine or converters and feed the same into a receiver, from which it is taken up by a strainer and strained and carried into a mixing or stirring apparatus. From the latter the pulp is fed in a continuous stream to a series of compressing-rolls, by which the greater part of the moisture contained in the pulp is pressed out and by which a rectangular form is imparted to the material. From the latter rolls we feed the compressed rectangular strip board or rail to a set of profiling or ornamenting rolls, by which the material is still further compressed and nearly all the remaining moisture removed, and by which said material is profiled or ornamented, the material issuing from between the last set of rolls in a compacted form and sufficiently free from moisture to adapt it to be handled and worked up, if necessary.

The operation is a continuous one, so that profiled or ornamented materials of any desired length may be obtained—such, for instance, as molding-rails for picture-frames, panels, (plain or ornamented,) and other similar materials.

The machine for carrying out this continuous process is constructed as follows: F indicates a frame-work that supports the receiving-tank T, in which is arranged a drum, D, composed of a perforated or reticulated material, $d$, stretched upon a suitable frame, $d'$, the drum being mounted upon a suitable shaft, D'. On the same frame, F, is mounted a mixing or stirring tank, $t$, whose wall $t'$ projects upward toward the straining-drum D and forms a chute, at the upper end of which is mounted a transfer-roll, H, that takes the pulp from the strainer. The pulp on the transfer-roll is scraped off by a scraper, $s$, and falls down the chute into the mixing or stirring tank $t$, that is provided with bearings for two shafts, $s'$ $s'$, on which are mounted stirrer-blades $b$ $b$.

From the tank $t$ extends a chute, $c$, communicating with said tank through an opening, $o$, by the valve or gate $g$ of which the volume of pulp fed to the compressing-rolls may be determined or regulated.

R $r$, R' $r'$, and R$^2$ $r^2$ are compressing and shaping rolls mounted in suitable standards, $f$, supported from a suitable base plate or plates, P, said rolls being arranged in successive pairs, the lower rolls, $r\ r'\ r^2$, of each pair having stationary bearings, while the upper rolls, $R\ R'\ R^2$, have their bearings arranged for vertical adjustment by means of set-screws C C, or otherwise, as may be found convenient.

$R^3\ r^3\ R^4\ r^4\ R^5\ r^5$ are the profiling or ornamenting rolls, arranged, like the compressing and shaping rolls, in successive pairs, the bearings of the upper rolls, $R^3\ R^4\ R^5$, thereof being also adjustable vertically in their standards by means of set-screws C, or otherwise.

The chute $c$ connects with a feed apron or table, A, that is preferably slightly inclined toward said tank and away from the first set of compressing-rolls. The sides or lateral vertical walls $a$ of said table A are adjustable laterally (the table being slotted, as shown at $a'$, Figs. 5 and 6) by means of adjusting bolts and nuts $a^2$. By means of this arrangement the width of the layer of pulp fed to the compressing-rolls may be varied so as to obtain rails or panels of varying width.

A like table is arranged between the rolls $R\ r$ and the rolls $R'\ r'$ and between the latter and the rolls $R^2\ r^2$, with the exception that the height of the side walls of the table is gradually reduced, as shown, this reduction of the side walls of the table A being continued from the first pair of compressing and shaping rolls to the delivery end A' of said table, which is practically formed of sections interposed between the different sets of rolls and having a feed and discharge end, at which latter point the side walls of the feed-table A are mere guide-cleats. The reason of this construction of feed and guide table is obvious, as the pulp when it passes from the chute to the rolls $R\ r$ is in a non-cohesive state. After passing through the first set of rolls it is compressed, causing it to part with a portion of its moisture, and it becomes cohesive. As it passes successively through the several sets of rolls the mass becomes gradually more and more cohesive until it leaves a solid board or rail from the delivery end of the table A almost free from moisture.

By making the side walls of the feed-table adjustable laterally they can be adjusted to varying widths of material, and as the thickness of the material is reduced as it passes through the different sets of rolls, so is the height of the side walls reduced to conform thereto, or practically so.

B B' are two flexible aprons, preferably made of felt. The apron B passes from the driving-roll 1 under the compressing-rolls $R\ R'\ R^2$, thence over guide-rolls 2, 3, and 4 back to the drive-roll 1. The apron B' passes from the driving-roll 5 over the lower rolls, $r\ r'\ r^2$, and the guide-rolls 6, 7, and 8 back to the driving-roll 5. These aprons carry the pulp to the first set of rolls, $R\ r$, where it is partially compressed and shaped, and thence to the rolls $R'\ r'$, where it is still further compressed, and finally to the rolls $R^2\ r^2$, from which it issues in a sufficiently compressed or cohesive condition to become self-feeding, and passes on to the profiling or ornamenting rolls $R^3\ r^3\ R^4\ r^4\ R^5\ r^5$.

We have hereinabove described the feed-table for the machine as having side walls that are adjustable laterally to the width of material to be produced. It will of course be understood that the feed-aprons B B' will be of corresponding width—that is to say, whenever the side walls of the table are adjusted to increase or decrease the distance between them the feed-aprons are removed and others corresponding to the new adjustment substituted.

Rails, strips, moldings, or panels in continuous lengths are thus produced, which may be cut to any required length after passing from the rolls $R^5\ r^5$. The different sets of rolls may be constructed in any desired manner for producing rails, strips, panels, or moldings of any desired width or thickness within certain limits.

In Fig. 2 we have shown one pair of the compressing-rolls, $R\ r$. The upper roll, R, is mounted on a shaft, S, a portion of which is enlarged or of greater diameter, as shown at S', and is secured thereto by means of screw-bolts $e'$, or in any other desired manner, said roll having a hub, $h$, projecting from opposite faces thereof, through which the bolts pass. By this means the roll is made removable from its shaft, which is necessary in a machine capable of producing stuff of varying width. The lower roll, $r$, is provided with gagerings E, secured thereto by screw-bolts $e$, that determine the width of the stuff turned out by the machine, said rings being adjustable laterally on the roll, and between them rotates the upper roll, R. Instead of providing the upper roll with a hub, $h$, a roll destitute of such hub may be employed, as shown in Fig. 3, which illustrates one pair of the profiling or ornamenting rolls, the upper roll, $R^3$, being confined on the enlarged portion of the shaft by means of confining-rings E E, the same as the lower roll, $r^3$, which is also mounted on an enlargement, S', of the shaft S, instead of being mounted on its shaft S, as shown in Fig. 2. This is necessary, since both rolls must be so arranged as to be removable from their shafts for the substitution of others of greater or less width or of a different pattern, or both.

By means of the last-described construction it will only be necessary to remove one of the rings E, when the rolls may be readily slipped off after the removal of the shaft from its bearings. To prevent the rolls from rotating independently on their shafts, they may be keyed or otherwise secured thereto.

In Fig. 4 we have shown a slight modification in the construction of the means for confining one or both rolls in place, said means consisting of flanged disks L L, whose flanges $l\ l$ fit over suitable peripheral shoulders, $m\ m$, formed on the roll or rolls. $l'\ l'$ are the screw-bolts by means of which the disks are secured to the enlarged portion $S'$ of the shaft $S$.

Any one of the described means for securing the rolls or any of them to their shafts may be employed, and said rolls and the other parts of the machine may be driven by means of any suitable arrangement of driving-gear. The upper and lower roll of each pair are or may be geared together, as shown in Fig. 4, the shaft of the lower roll of each pair carrying a worm-wheel, $W'$, meshing with a worm, $W$, on a counter-shaft, $S^2$, or in any other well-known or preferred manner; and as the mode of and means for operating the several parts of the machine form no part of our invention they need not be shown or described in detail.

The roll-shafts may be made adjustable endwise in their bearings, though this is not necessary, since the vertical walls of the feed-table are adjustable laterally, so that when a wider roll is substituted for a narrow one the feed-table may be correspondingly adjusted.

As described, our machine is adapted for a wide range of use, as plain or profiled or ornamented strips, rails, or paneling of any desired form in cross-section and of any desired length and within certain limits of any desired width and thickness may be produced by the interchangeability of the rolls thereof.

The operation of this machine is as follows: The wood pulp, as it comes from the pulping-machines or converters, or after being washed or freed from acid, is introduced into the tank $T$, is there taken up by the strainer-drum $D$, and strained. The pulp is taken off the drum by the transfer-roll $H$, from which it is scraped off by the scraper $s$, and falls into the tank $t$. If the pulp, on reaching the tank $t$, is too dry, it may be mixed with water; or the pulp may be mixed with a solution of coloring-matter to give it any desired color or shade of a color, and, if necessary, a suitable binding material may be mixed therewith. If a water or fire proof material is desired, a water or fire proofing solution is mixed with the pulp, which should have the consistency of a paste of sufficient fluidity to run freely out of the tank through the valved opening $o$. As the pulp leaves the tank it is taken up by the felt apron $B'$ and carried to the rolls $R$ and $r$, where it is compressed between said apron $B'$ and the apron $B$ and receives a rectangular shape. Thence it is carried by the aprons along the table $A$ to the rolls $R'\ r'$, and from the latter to the rolls $R^2\ r^2$. When the material issues from between the rolls $R^2\ r^2$, it is in such a compact or compressed and dried state that it becomes self-feeding and passes successively between the profiling or ornamenting rolls, where it receives its final shape if a profiled or ornamented article is desired, and leaves the last pair of rolls in such a condition as to be readily cut into the desired lengths, after which it is finally freed from the last traces of moisture, and is in a condition for use.

If the article to be produced is to be plain and of a given form in cross-section—as, for instance, a plain board—the rolls $R^3\ r^3\ R^4\ r^4\ R^5\ r^5$ will be like the rolls $R\ r$, $R'\ r'$, and $R^2\ r^2$, as will be understood.

We of course do not confine ourselves to the specific number of sets of rolls described, as these may be varied. Although the machine is more especially designed for working up wood pulp to produce materials of continuous lengths, it is evident that other analogous plastic materials may be worked up—that is to say, materials rendered plastic by moisture, and from which the moisture may be expelled by compression and any desired form imparted to them during the compression, so that not only articles of any desired length may be produced, but of such compactness and solidity and in such a dry condition as to be handled without danger of breaking and cut up into suitable lengths.

Having now particularly described our invention, what we claim, and desire to secure by Letters Patent, is—

1. In a machine of the class described, in combination with the compressing-rolls and a feed-table having laterally-adjustable side walls, of feed-aprons varying in width operating in conjunction with said feed-table, as and for the purpose specified.

2. In a machine of the class described, the combination, with a plurality of sets of compressing-rolls, of a feed-table formed of sections interposed between the sets of rolls, said table being slotted and having vertical side walls provided with adjusting bolts and nuts, whereby said walls are rendered laterally adjustable on the table, all arranged as described, for the purpose specified.

3. In a machine of the class described, the combination, with a plurality of sets of compressing and profiling rolls, of a feed-table formed of sections interposed between the sets of rolls and having vertical side walls which taper from the feed end of the machine to the discharge end thereof, and the side walls of those sections between the sets of compressing-rolls being laterally adjustable, for the purpose specified.

4. The combination, with a receiving-tank for the plastic material and a revoluble strainer carried therein for straining the material, of a mixing-tank and transferring devices for taking the strained material from the strainer and discharging it into the mixing-tank for the addition thereto of a water or fire proofing or other substance, as described.

5. The combination, with a receiving-tank for the plastic material, a revoluble strainer carried therein for taking up and straining the material, a transfer-roll for taking the material from the strainer after being strained thereby, and a scraper for scraping the material from the transfer-roll, of a mixing-tank for receiving the strained material as it is taken from the transfer-roll, and revoluble stirrers carried therein, whereby a water or fire proofing or other substance may be mixed with the plastic material, as described.

6. The combination, with the profiling-roll $R^3$, of the profiling-roll $r^3$, provided with peripheral seats $m\ m$, and the removable heads or disks L L for said roll $r^3$, constructed with annular flanges for said seats, substantially as and for the purpose specified.

In testimony whereof we affix our signatures in presence of two witnesses.

ANDREAS GUULSEN HOHRE.
OLE GUULSEN HOHRE.

Witnesses:
CHR. SECHERY,
OSCANT RUNG.